US012502753B2

(12) United States Patent
Peng et al.

(10) Patent No.: US 12,502,753 B2
(45) Date of Patent: Dec. 23, 2025

(54) SLEEVE ASSEMBLY AND ELECTRIC TOOL

(71) Applicant: JIANGSU DONGCHENG TOOLS TECHNOLOGY CO., LTD., Jiangsu (CN)

(72) Inventors: Xiaohu Peng, Jiangsu (CN); Zhigang Wu, Jiangsu (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 384 days.

(21) Appl. No.: 18/090,477

(22) Filed: Dec. 28, 2022

(65) Prior Publication Data

US 2023/0158643 A1 May 25, 2023

Related U.S. Application Data

(63) Continuation of application No. PCT/CN2022/098286, filed on Jun. 11, 2022.

(30) Foreign Application Priority Data

Jul. 28, 2021 (CN) ......................... 202110855520.0

(51) Int. Cl.
*B25B 23/12* (2006.01)
*B25B 21/00* (2006.01)

(52) U.S. Cl.
CPC ............ *B25B 21/002* (2013.01); *B25B 23/12* (2013.01)

(58) Field of Classification Search
CPC ....... B25B 13/06; B25B 21/00; B25B 21/002; B25B 21/007; B25B 23/0021;
(Continued)

(56) References Cited

U.S. PATENT DOCUMENTS 4,266,453 A * 5/1981 Farley ................. B25B 23/0035 81/177.85
5,249,489 A * 10/1993 Weisman ................ B25B 13/06 81/125
(Continued)

FOREIGN PATENT DOCUMENTS

CN 103707244 A 4/2014
CN 106312881 A 1/2017
(Continued)

OTHER PUBLICATIONS

International Search Report of PCT Patent Application No. PCT/CN2022/098286 issued on Sep. 14, 2022.
(Continued)

*Primary Examiner* — Robert J Scruggs

(57) ABSTRACT

A sleeve assembly and an electric tool are provided. The sleeve assembly includes a sleeve defining a receiving cavity recessed backward from a first end face of the sleeve. The nut is received in the receiving cavity. The sleeve assembly also includes a pull rod assembly arranged in the receiving cavity. The pull rod assembly includes a pull rod extending along a central axis of the sleeve, a pulling component arranged at one end of the pull rod, and a bearing arranged at another end of the pull rod opposite to the pulling component. The pull rod is connected to an inner wall of the sleeve through the bearing, and the pull rod is rotatable relative to the sleeve. In response to the sleeve assembly screwing the nut, the pulling component is configured to drive the bolt to be attached to a surface of the to-be-fixed component.

19 Claims, 7 Drawing Sheets

(58) Field of Classification Search
CPC ............ B25B 23/0035; B25B 23/0057; B25B 23/0071; B25B 23/08; B25B 23/0085; B25B 23/12
See application file for complete search history.

(56) References Cited

U.S. PATENT DOCUMENTS

| | | | | |
|---|---|---|---|---|
| 2011/0036212 | A1* | 2/2011 | Santamarina | B25B 23/14 81/436 |
| 2011/0113932 | A1 | 5/2011 | Lambert et al. | |

FOREIGN PATENT DOCUMENTS

| | | | | |
|---|---|---|---|---|
| CN | 106926179 | | * | 7/2017 |
| CN | 106926179 | A | | 7/2017 |
| CN | 206795702 | U | | 12/2017 |
| CN | 109605262 | A | | 4/2019 |
| CN | 209831460 | U | | 12/2019 |
| CN | 110695898 | A | | 1/2020 |
| CN | 113524098 | A | | 10/2021 |
| CN | 215847904 | U | | 2/2022 |
| JP | H1015840 | A | | 1/1998 |
| JP | 2017217706 | | * | 12/2017 |
| JP | 2017217706 | A | | 12/2017 |

OTHER PUBLICATIONS

Chinese First Office Action, Chinese Application No. 202110855520.0, mailed Aug. 5, 2024 (14 pages).
Chinese Rejection decision, Application No. 202110855520.0, Chinese mailed Aug. 23, 2024 (12 pages).

* cited by examiner

SLEEVE ASSEMBLY AND ELECTRIC TOOL

CROSS REFERENCE TO RELATED APPLICATIONS

The present application is a continuation-application of International (PCT) Patent Application No. PCT/CN2022/098286, filed on Jun. 11, 2022, which claims priority to Chinese Patent Application No. 202110855520.0 filed with China National Intellectual Property Administration on Jul. 28, 2021, the contents of which are herein incorporated by reference in their entireties.

TECHNICAL FIELD

The present disclosure relates to technical field of installations instrument, in particular to a sleeve assembly and an electric tool with simple operation.

BACKGROUND

An electric wrench is a wrench powered by a power supply or a battery, which is a tool for tightening a bolt. The electric wrench is mainly classified as an impact wrench, a torsion shear wrench, a constant-torque wrench, a corner wrench, an angular wrench, a hydraulic wrench, a torque wrench, and a rechargeable electric wrench. An electric wrench with a sleeve is a tool that people often use in their daily work and life, and is essential both in ordinary mechanical maintenance and in a process of construction installation. The existing electric wrench can tighten a nut with a bolt through multiple instruments and operations, but a work efficiency is low.

SUMMARY

The technical solution provided in the present disclosure to solve problem in the related art is as following. A sleeve assembly is provided and configured to screw a nut to a bolt located on a to-be-fixed component. The sleeve assembly also includes a sleeve defining a receiving cavity recessed backward from a first end face of the sleeve. The nut is received in the receiving cavity. The sleeve assembly also includes a pull rod assembly arranged in the receiving cavity. The pull rod assembly includes a pull rod extending along a central axis of the sleeve, a pulling component arranged at one end of the pull rod, and a bearing arranged at another end of the pull rod opposite to the pulling component. The pull rod is connected to an inner wall of the sleeve through the bearing, and the pull rod is rotatable relative to the sleeve. In response to the sleeve assembly screwing the nut, the pulling component is configured to drive the bolt to be attached to a surface of the to-be-fixed component.

The technical solution provided in the present disclosure to solve problem in the related art is as following. An electric tool is provided and includes a housing, a motor arranged in the housing, a transmission mechanism connected to the motor, and an output shaft driven by the transmission mechanism. The output shaft is partially exposed from a front end of the housing. The electric tool also includes the sleeve assembly mentioned above. The sleeve assembly is fixedly connected to a first end of the output shaft away from the motor.

A technical solution provided in the present disclosure to solve problem in the related art is as following. An electric tool configured to screw a nut to a bolt located on a to-be-fixed component is provided and includes a housing, an output shaft, partially exposed from a first end of the housing; and a sleeve assembly. The sleeve assembly includes a sleeve extending along an axial direction of the output shaft, wherein the output shaft is inserted into the sleeve and a pull rod assembly received in the sleeve. The pull rod assembly includes a pull rod extending along the axis direction of the output shaft and rotatably connected to the sleeve and a magnetic component arranged at one end of the pull rod away from the output shaft. In response to the sleeve assembly screwing the nut, the magnetic component adsorbs the bolt, and the sleeve assembly applies a force to the bolt, such that the bolt is attached to a surface of the to-be-fixed component.

BRIEF DESCRIPTION OF THE DRAWINGS

Specific embodiments of the present disclosure are further described in detail below in combination with drawings.

Figure 1:
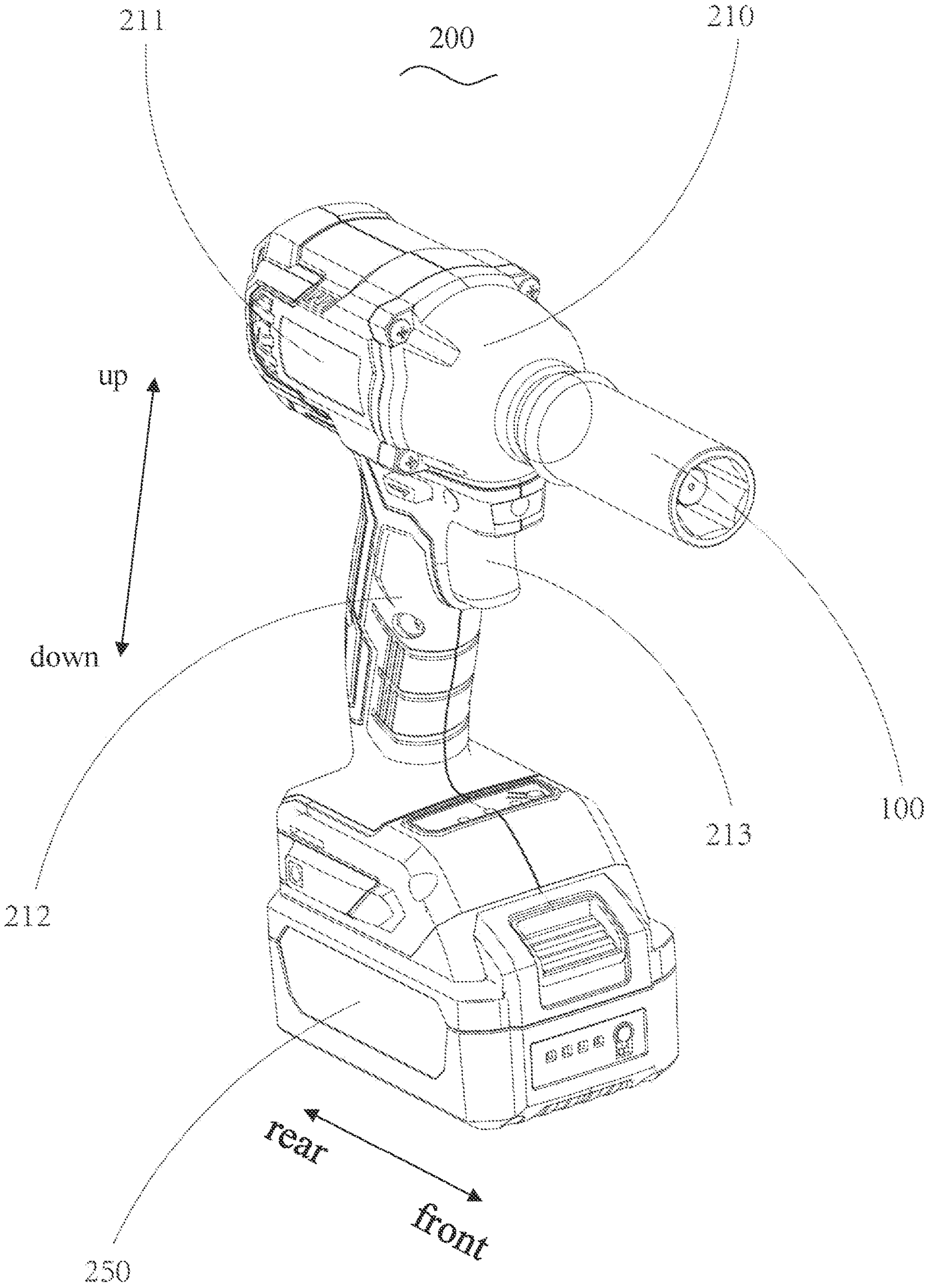
FIG. 1 is a perspective schematic view of an electric tool according to an embodiment of the present disclosure.

Reference labels in the drawings.

sleeve assembly 100, sleeve 10, receiving cavity 11, connecting channel 12, groove 13, through hole 14, pin 15, sealing ring 16, pull rod assembly 20, pull rod 21, magnetic component 22, bearing 23, magnetic steel 24, protective sleeve 25, electric tool 200, housing 210, body portion 211, holding portion 212, operation button 213, motor 220, transmission mechanism 230, output shaft 240, battery pack 250, to-be-fixed component 300, nut 310, bolt 320, nut cap 321, screw 322.

DETAILED DESCRIPTION

Terms used in the present disclosure are only for purpose of describing specific embodiments, not for limiting the present disclosure. For example, following terms indicating orientations or position relationships, such as "up", "down", "front", "rear" and so on are only based on orientations or position relationships shown in the accompanying drawings, and are only for convenience of describing the present disclosure and simplifying description, rather than indicating or implying that a device or a component referred to must have a particular orientation or be constructed and operated in a particular orientation. Therefore, the terms cannot be understood as a limitation of the present disclosure.

Figure 2:
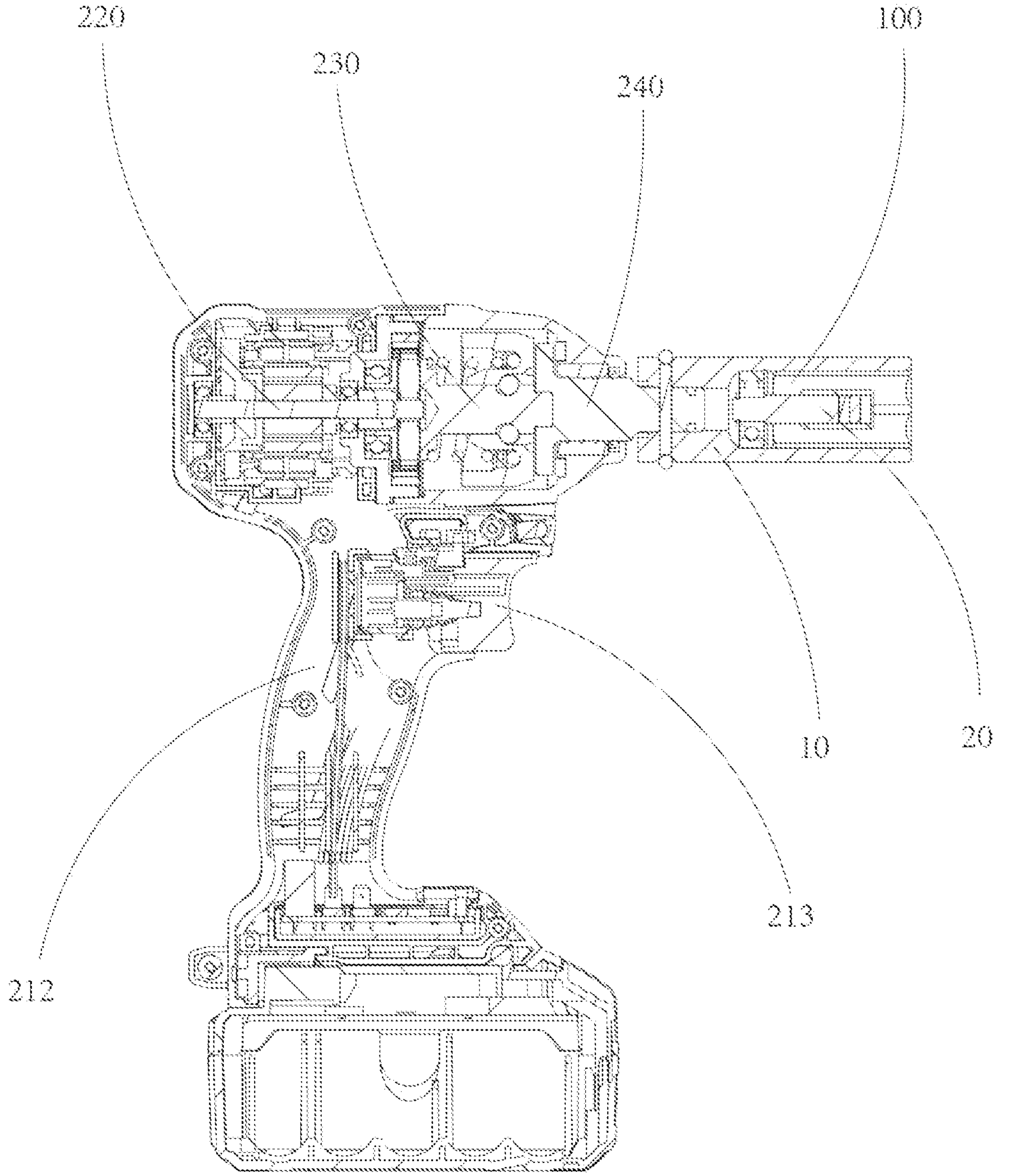
FIG. 2 is a sectional view of the electric tool shown in FIG. 1.

As shown in FIGS. 1 and 2, an electric tool 200 is provided in some embodiments of the present disclosure. In this embodiment, the electric tool 200 may be an electric wrench, and may include a housing 210, a motor 220 arranged in the housing 210, a transmission mechanism 230 connected to the motor 220, an output shaft 240 driven by the transmission mechanism 230, and a sleeve assembly 100 connected to a front end of the output shaft 240. The output shaft 240 is partially exposed from a front end of the housing 210. That is to say, the output shaft 240 includes two opposite ends along the axial direction of the output shaft 240, namely the front end and a rear end. The front end of the output shaft 240 is connected to the sleeve assembly 100 while the rear end of the output shaft 240 is connected to the transmission mechanism 230. The output shaft 240 is a wrench head at least partially exposed from the front end of the housing 210, and the motor 220 drives, through the transmission mechanism 230, the output shaft 240 to drive the sleeve assembly 100 to operate. Herein, the front end of the housing 210 refers to the end of the housing 210 away from the motor 220 along the axis direction of the output shaft 240.

The housing 210 may include a body portion 211 extending along an axis of the output shaft 240 and a holding portion 212 connected to a lower part of the body portion 211. The motor 220 and the transmission mechanism 230 are both received in the body portion 211. The output shaft 240 is partially received in the body portion 211 with a part thereof exposed from the housing 210. The holding portion 212 is configured to be held by a user when the user is using and operating the electric tool 200. The holding portion 212 is arranged with an operation button 213 for the user to operate, so as to control the electric tool 200 to start and stop. The electric tool 200 may also include a battery pack 250 connected to a lower end of the holding portion 212, and the battery pack 250 is configured to supply power to the electric tool 200. That is to say, the holding portion 212 may have an upper end and a lower end opposite to the upper end as shown in FIG. 1. The body portion 211 is located at the upper end of the holding portion 212, while the battery pack 250 is located at the lower end of the holding portion 212 and away from the body portion 211.

Figure 3:
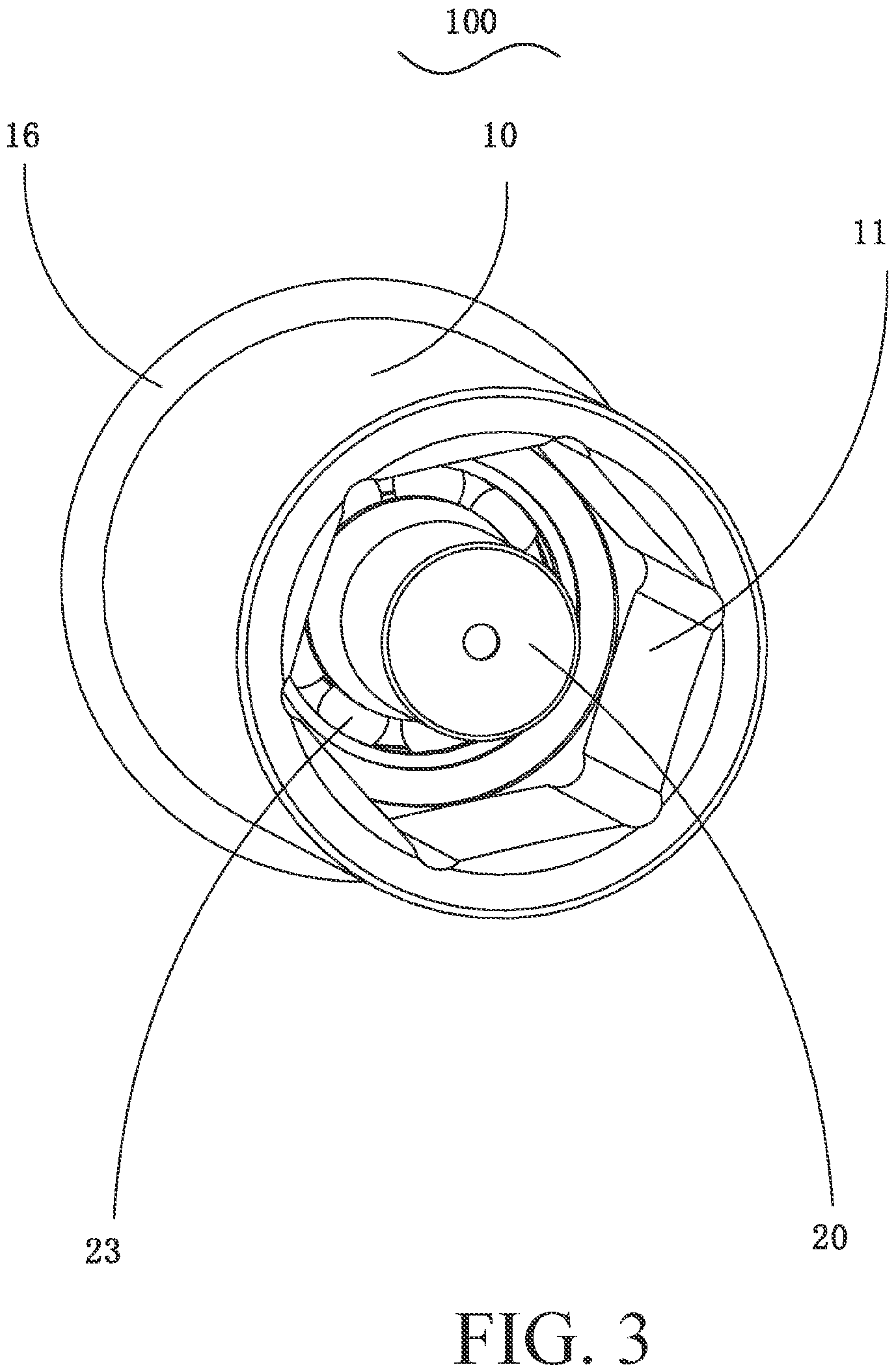
FIG. 3 is a perspective schematic view of a sleeve assembly in the electric tool shown in FIG. 1.
Figure 4:
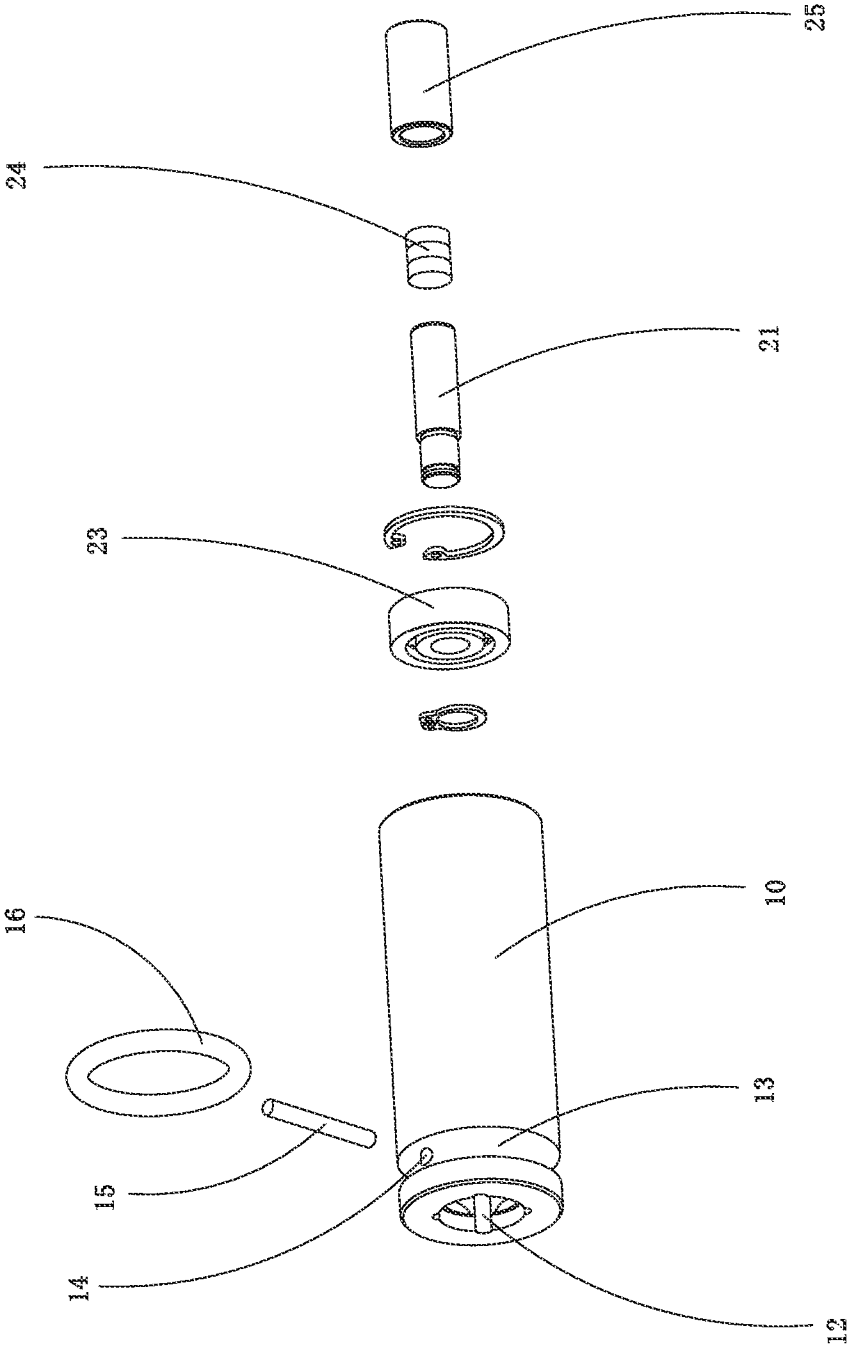
FIG. 4 is an exploded schematic view of the sleeve assembly shown in FIG. 3.

As shown in FIGS. 3 and 4, the sleeve assembly 100 may include a sleeve 10 extending along an axis of the output shaft 240 and a pull rod assembly 20 arranged in the sleeve 10. A receiving cavity 11 recessed backward from a front end face of the sleeve 10 is defined in the sleeve 10, a connecting channel 12 recessed forward from a rear end face of the sleeve 10 is defined in the sleeve 10, and a nut 310 is received in the receiving cavity 11. The output shaft 240 extends into the connecting channel 12, such that the sleeve assembly 100 is fixedly connected to the front end of the connecting channel 12, thereby enabling the motor 220 to drive the sleeve assembly 100 to operate through the output shaft 240. In other words, the sleeve 10 has a first end and a second end opposite to each other, and further includes a first end face disposed at the first end and a second end face disposed at the second end. The first end may also be called as “front end”, and the first end face may be called as “front end face”. The second end may also be called as “rear end”, and the second end face may be called as “rear end face”. The receiving cavity 11 is disposed adjacent to the first end and recessed from the first end face in a direction towards the second end face. While the connecting channel 12 is disposed adjacent to the second end and recessed from the second end face in a direction towards the first end face. The receiving cavity 11 is in communication with the connecting channel 12.

Specifically, a groove 13 substantially in shape of an annulus and recessed inwards from a peripheral surface of the rear end (second end) of the sleeve 10 is defined in the sleeve 10, and a through hole 14 radially (that is, in a direction close to a central axis of the sleeve 10) extending or running through the sleeve 10 from the peripheral surface of the rear end the sleeve 10 is further defined in the sleeve 10. The groove 13 is defined around the peripheral direction of the sleeve 10. The through hole 14 extends inwards from a wall defining the groove 13 and is fluidly coupled to the connecting channel 12. The sleeve assembly 100 may also include a pin 15 corresponding to the through hole 14 and a sealing ring 16 clamped or engaged in the groove 13. When a front end of the output shaft 240 is located in the connecting channel 12, the pin 15 is inserted in the through hole 14 and penetrates the output shaft 240, and an inner ring of the sealing ring 16 abuts against both ends of the pin 15. Therefore, it is possible to ensure that the sleeve assembly 100 is stably and fixedly connected to the front end of the electric tool 200. In some embodiments, the sealing ring 16 may be made of rubber, that is, may be a rubber ring.

The pull rod assembly 20 is arranged in the receiving cavity 11 and may include a pull rod 21 extending along the central axis of the sleeve 10, a magnetic component 22 (also called as “pulling component” in some embodiments) arranged at a front end of the pull rod 21, and a bearing 23 arranged at a rear end of the pull rod 21. The pull rod 21 is connected to an inner wall of the sleeve 10 through the bearing 23, such that the pull rod 21 may be axially fixed on the sleeve 10 and is rotatable relative to the sleeve 10. The magnetic component 22 may include a magnetic steel 24 arranged on a front end face of the pull rod 21 and a protective sleeve 25 sleeved on an outside of the magnetic steel 24. The protective sleeve 25 extends backward from a front end of the magnetic steel 24 and is sleeved on a periphery of the pull rod 21, such that the magnetic steel 24 is stably connected to the pull rod 21. In some embodiments, the magnetic component 22 may be replaced by other pulling components, such as an adsorbing component configured to drive the bolt to be attached to the surface of the to-be-fixed component.

Figure 5:
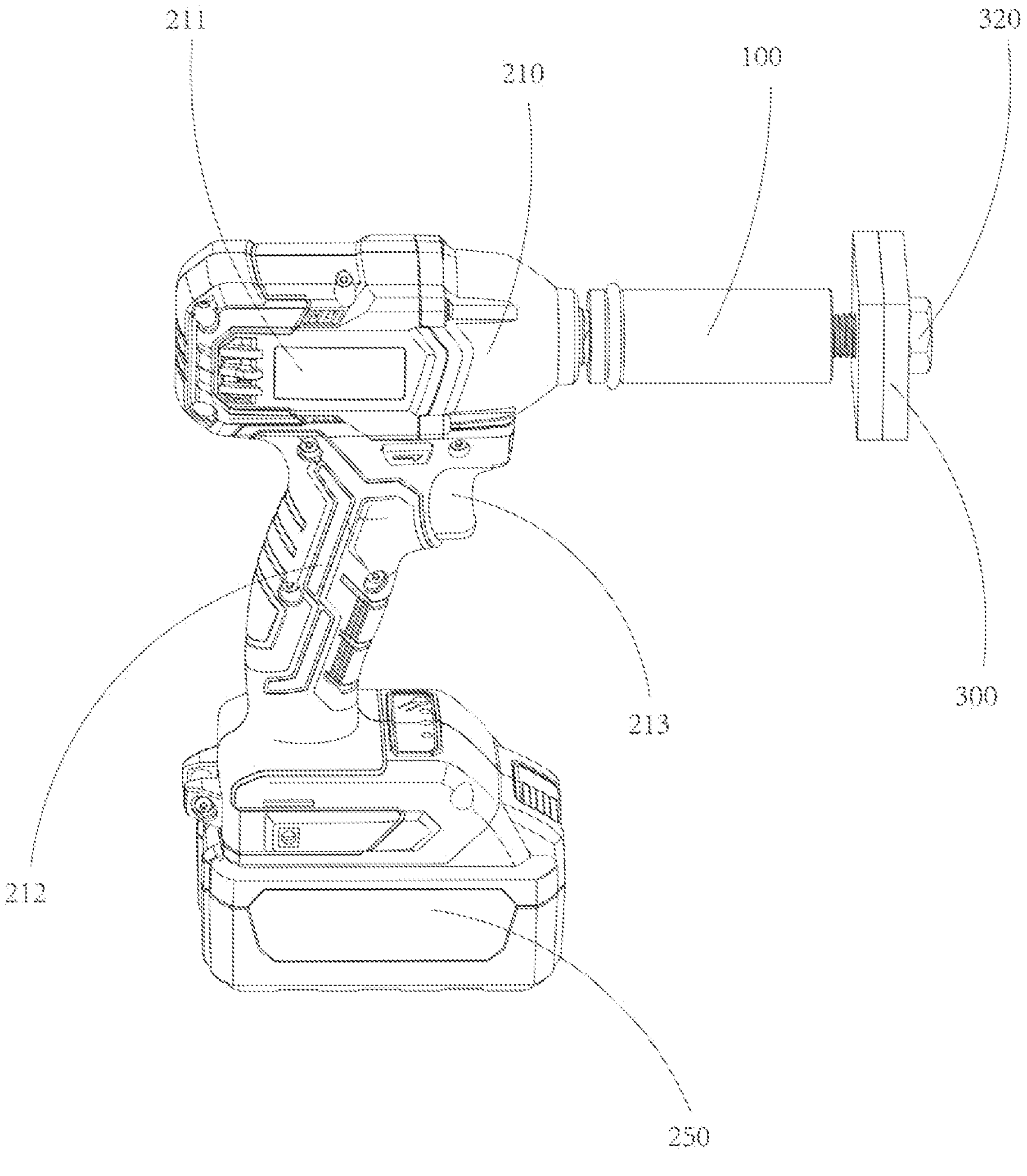
FIG. 5 is a perspective schematic view of the electric tool shown in FIG. 1 when the electric tool is in a used state.
Figure 6:
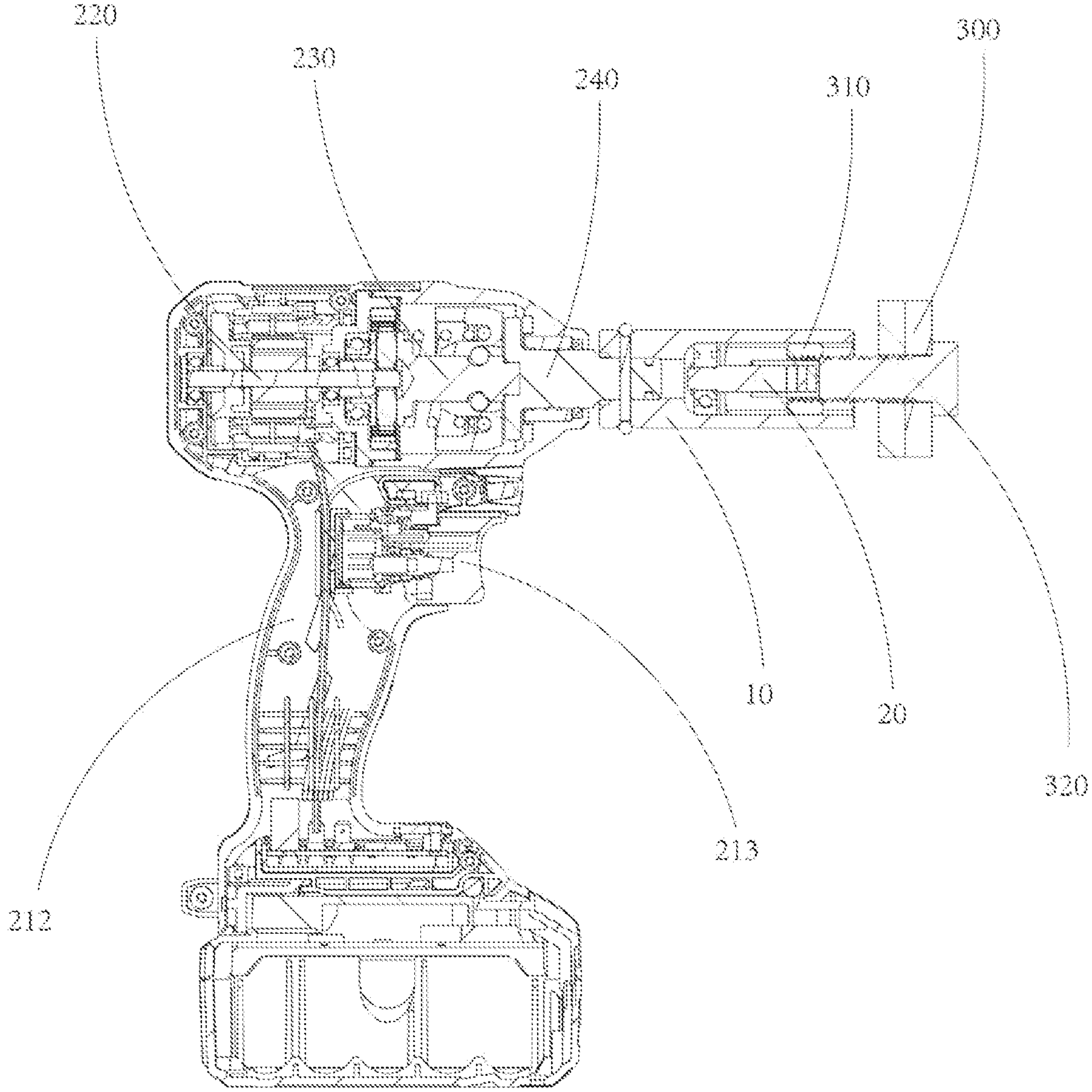
FIG. 6 is a sectional view of the electric tool shown in FIG. 5 when the electric tool is in the used state.
Figure 7:
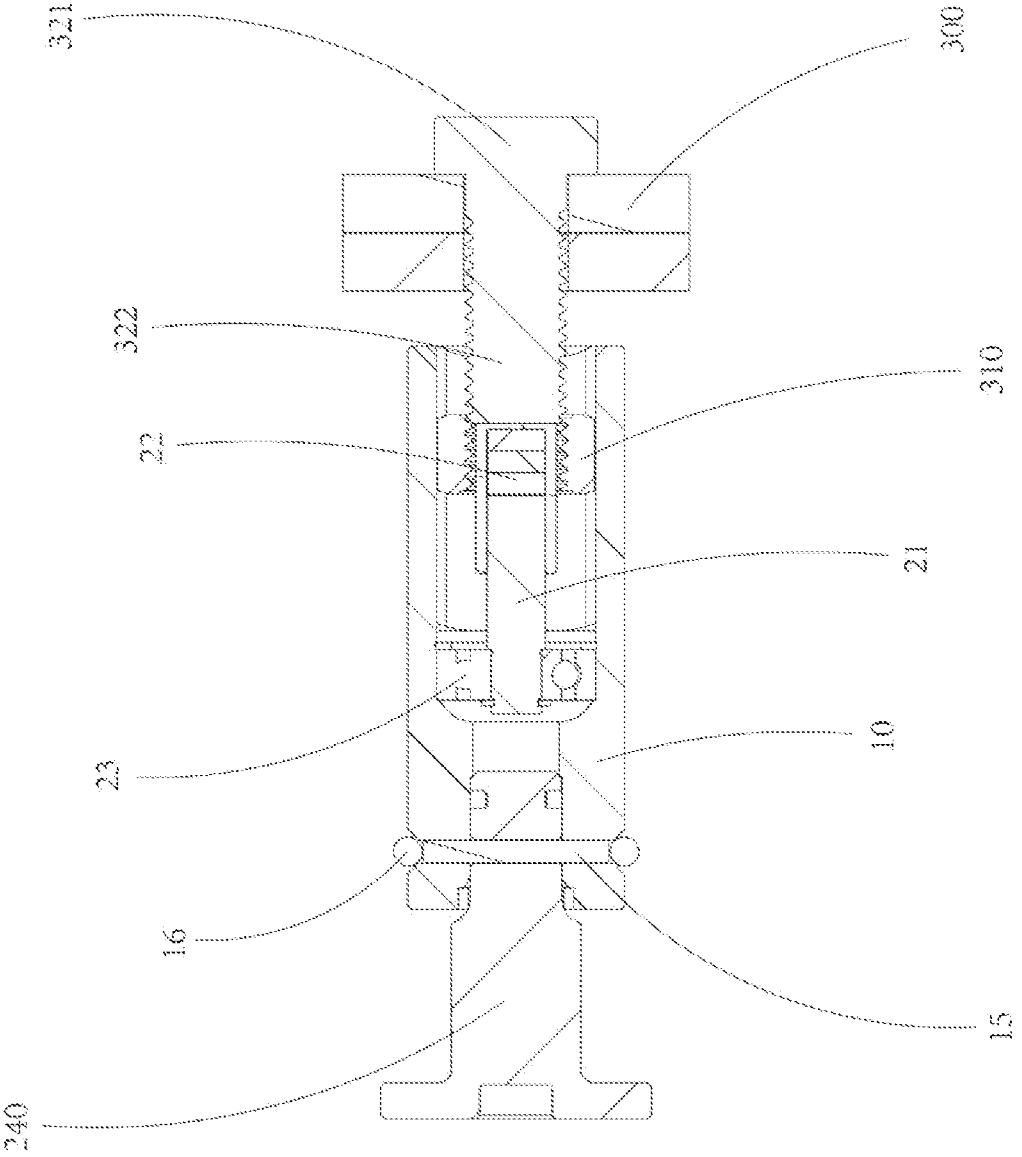
FIG. 7 is a partially enlarged view of the electric tool shown in FIG. 6 when the electric tool is in the used state.

As shown in FIGS. 5 to 7, the sleeve assembly 100 according to some embodiments of the present disclosure is configured to screw the nut 310 to a bolt 320 arranged on a to-be-fixed component 300. The to-be-fixed component 300 includes two sub-components that are attached and contacted to each other and to be fixed. The bolt 320 includes a nut cap 321 and a screw 322. The nut cap 321 is located on a side of the to-be-fixed component 300. The screw 322 extends from the nut cap 321, penetrates the to-be-fixed component 300 and extends to another side of the to-be-fixed component 300. The electric tool 200 is arranged on the another side of the to-be-fixed component 300 through the sleeve assembly 100 receiving the nut 310.

A shape of a periphery of the nut 310 is substantially regular multi prism, and a shape of the receiving cavity 11 corresponds to or matches with the shape of the periphery of the nut 310. That is, the shape of the receiving cavity 11 is also substantially regular multi prism, so as to receive the nut 310. A diameter of the pull rod assembly 20 is smaller than an inner diameter of the nut 310, such that when the nut 310 is received in the receiving cavity 11, the nut 310 is abstracted by the magnetic component 22 to move to a periphery of the magnetic component 22.

When the sleeve assembly 100 is screwing the nut 310, the magnetic component 22 adsorbs the bolt 320 and the sleeve assembly 100 applies a force to the bolt 320 to make the bolt 320 attached to a surface of the to-be-fixed component 300 and prevent the bolt 320 from moving relative to the to-be-fixed component 300. Specifically, when the sleeve assembly 100 is screwing the nut 310, the screw 322 extends into the receiving cavity 11, the magnetic steel 24 of the magnetic component 22 adsorbs one end of the screw 322, and the sleeve assembly 100 applies a force away from the to-be-fixed component 300 to the screw 322 to make the nut cap 321 attached to the surface of the to-be-fixed component 300, thereby generating a friction. The friction may prevent the bolt 320 from rotating with the nut 310. That is, the bolt 320 cannot move relative to the to-be-fixed component 300, thereby tightening the nut 310 with the bolt 320.

A sleeve assembly is provided and configured to screw a nut to a bolt located on a to-be-fixed component. The sleeve assembly also includes a sleeve defining a receiving cavity recessed backward from a first end face of the sleeve. The nut is received in the receiving cavity. The sleeve assembly also includes a pull rod assembly arranged in the receiving cavity. The pull rod assembly includes a pull rod extending along a central axis of the sleeve, a pulling component arranged at one end of the pull rod, and a bearing arranged at another end of the pull rod opposite to the pulling component. The pull rod is connected to an inner wall of the sleeve through the bearing, and the pull rod is rotatable relative to the sleeve. In response to the sleeve assembly screwing the nut, the pulling component is configured to drive the bolt to be attached to a surface of the to-be-fixed component.

In some embodiments, the pulling component is a magnetic component arranged at one end of the pull rod; in response to the sleeve assembly screwing the nut, the magnetic component adsorbs the bolt, and the sleeve assembly applies a force to the bolt, such that the bolt is attached to a surface of the to-be-fixed component.

In some embodiments, a diameter of the pull rod assembly is smaller than an inner diameter of the nut.

In some embodiments, the magnetic component includes a magnetic steel arranged on a front end face of the pull rod.

In some embodiments, the magnetic component further includes a protective sleeve sleeved on an outside of the magnetic steel, the protective sleeve extends backwards from a front end of the magnetic steel, and is sleeved on a periphery of the pull rod.

In some embodiments, a shape of the receiving cavity matches with a shape of the periphery of the nut.

In some embodiments, the pulling component is configured to attract the nut to move to a periphery of the pulling component in a case where the nut is received in the receiving cavity.

In some embodiments, the bolt includes a nut cap located on a side of the to-be-fixed component and a screw extending from the nut cap, penetrating the to-be-fixed component, and extending to another side of the to-be-fixed component; in response to the sleeve assembly screwing the nut, the screw extends into the receiving cavity, the pulling component pulls one end of the screw away from the to-be-fixed component.

An electric tool is provided and includes a housing, a motor arranged in the housing, a transmission mechanism connected to the motor, and an output shaft driven by the transmission mechanism. The output shaft is partially exposed from a front end of the housing. The electric tool also includes the sleeve assembly mentioned above. The sleeve assembly is fixedly connected to a first end of the output shaft away from the motor.

In some embodiments, a connecting channel recessed forward from a rear end face of the sleeve is defined in the sleeve, and the output shaft extends into the connecting channel such that the sleeve assembly is fixedly connected to the first end of the output shaft away from the motor.

In some embodiments, the pulling component is a magnetic component arranged at one end of the pull rod; in response to the sleeve assembly screwing the nut, the magnetic component adsorbs the bolt, and the sleeve assembly applies a force to the bolt, such that the bolt is attached to a surface of the to-be-fixed component.

In some embodiments, a diameter of the pull rod assembly is smaller than an inner diameter of the nut; a shape of the receiving cavity matches with a shape of the periphery of the nut.

In some embodiments, the magnetic component includes a magnetic steel arranged on a front end face of the pull rod.

In some embodiments, the magnetic component further includes a protective sleeve sleeved on an outside of the magnetic steel, the protective sleeve extends backwards from a front end of the magnetic steel, and is sleeved on a periphery of the pull rod.

In some embodiments, the pulling component is configured to attract the nut to move to a periphery of the pulling component in a case where the nut is received in the receiving cavity.

In some embodiments, the bolt includes a nut cap located on a side of the to-be-fixed component and a screw extending from the nut cap, penetrating the to-be-fixed component, and extending to another side of the to-be-fixed component; in response to the sleeve assembly screwing the nut, the screw extends into the receiving cavity, the pulling component pulls one end of the screw away from the to-be-fixed component.

In some embodiments, a through hole radially extending through the sleeve from a peripheral surface of the rear end of the sleeve is defined in the sleeve, the through hole is fluidly coupled to the connecting channel, the sleeve assembly includes a pin corresponding to the through hole; in a case where a front end of the output shaft is located in the connecting channel, the pin is inserted in the through hole and penetrates the output shaft.

In some embodiments, a groove substantially in shape of an annulus and recessed inwards from the peripheral surface of the rear end of the sleeve is defined in the sleeve, and the through hole extends inwards from the groove and is fluidly coupled to the connecting channel; the sleeve assembly includes a sealing ring clamped in the groove, and in a case where the front end of the output shaft is located in the connecting channel, an inner ring of the sealing ring abuts against both ends of the pin.

In some embodiments, the electric tool is an electric wrench, and the output shaft is a wrench head at least partially exposed from a front end of the housing.

An electric tool configured to screw a nut to a bolt located on a to-be-fixed component is provided and includes a housing, an output shaft, partially exposed from a first end of the housing; and a sleeve assembly. The sleeve assembly includes a sleeve extending along an axial direction of the output shaft, the output shaft is inserted into the sleeve and a pull rod assembly received in the sleeve. The pull rod assembly includes a pull rod extending along the axis direction of the output shaft and rotatably connected to the sleeve and a magnetic component arranged at one end of the pull rod away the output shaft. In response to the sleeve assembly screwing the nut, the magnetic component adsorbs the bolt, and the sleeve assembly applies a force to the bolt, such that the bolt is attached to a surface of the to-be-fixed component.

In the present disclosure, the pull rod assembly 20 includes the pull rod 21 extending along the central axis of the sleeve 10, the magnetic component 22 arranged at the front end of the pull rod 21, and the bearing 23 arranged at the rear end of the pull rod 21. The pull rod 21 is connected to the inner wall of the sleeve 10 through the bearing 23, such that the pull rod 21 is rotatable relative to the sleeve 10. When the sleeve assembly 100 is screwing the nut 310, the magnetic component 22 adsorbs the bolt 320, and the sleeve assembly 100 applies the force to the bolt 320 to make the bolt 320 attached to the surface of the to-be-fixed component 300, thereby generating the friction. The friction may prevent the bolt 320 from rotating with the nut 310. That is, the bolt 320 cannot move relative to the to-be-fixed component 300. The sleeve assembly 100 ensures that the electric tool 200 may tighten the nut 310 with the bolt 320 without additional instrument to fix the bolt 320. The operation is simple and convenient, which improves a working efficiency and reduces an operation difficulty.

The present disclosure is not limited to above specific embodiments. Those skilled can easily understand that there are many alternatives to the sleeve assembly and electric tool of the present disclosure without departing from the principle and scope of the present disclosure. The scope of the present disclosure is subject to the claims.

What is claimed is:

1. A sleeve assembly configured to screw a nut to a bolt located on a to-be-fixed component, the sleeve assembly comprising:

a sleeve defining a receiving cavity recessed backward from a first end face of the sleeve, and the nut being configured to be received in the receiving cavity;

a pull rod assembly arranged in the receiving cavity, and comprising:

a pull rod extending along a central axis of the sleeve;

a pulling component arranged at one end of the pull rod; and a bearing arranged at another end of the pull rod opposite to the pulling component;

wherein the pull rod is connected to an inner wall of the sleeve through the bearing, and the pull rod is rotatable relative to the sleeve;

in response to the sleeve assembly screwing the nut, the pulling component is configured to drive the bolt to be attached to a surface of the to-be-fixed component;

wherein the pulling component comprises:

a magnetic steel arranged on a front end face of the pull rod; and a protective sleeve sleeved on an outside of the magnetic steel, the protective sleeve extends backwards from a front end of the magnetic steel away from the pull rod, and is sleeved on a periphery of the pull rod.

2. The sleeve assembly according to claim 1, wherein the pulling component is a magnetic component arranged at one end of the pull rod;

in response to the sleeve assembly screwing the nut, the magnetic component is configured to adsorb the bolt, and the sleeve assembly applies a force to the bolt, such that the bolt is attached to a surface of the to-be-fixed component.

3. The sleeve assembly according to claim 1, wherein a diameter of the pull rod assembly is smaller than an inner diameter of the nut.

4. The sleeve assembly according to claim 1, wherein a shape of the receiving cavity matches with a shape of the periphery of the nut.

5. The sleeve assembly according to claim 1, wherein the pulling component is configured to attract the nut to move to a periphery of the pulling component in a case where the nut is received in the receiving cavity.

6. The sleeve assembly according to claim 1, wherein the bolt comprises a nut cap located on a side of the to-be-fixed component and a screw extending from the nut cap, penetrating the to-be-fixed component, and extending to another side of the to-be-fixed component;

wherein in response to the sleeve assembly screwing the nut, the screw extends into the receiving cavity, the pulling component pulls one end of the screw away from the to-be-fixed component.

7. The sleeve assembly according to claim 1, wherein the pull rod is axially fixed on the sleeve.

8. An electric tool, comprising:

a housing;

a motor arranged in the housing;

a transmission mechanism connected to the motor;

an output shaft driven by the transmission mechanism, and partially exposed from a front end of the housing; and a sleeve assembly configured to screw a nut to a bolt located on a to-be-fixed component, the sleeve assembly comprising:

a sleeve defining a receiving cavity recessed backward from a first end face of the sleeve, and the nut being received in the receiving cavity;

a pull rod assembly, arranged in the receiving cavity, and comprising:

a pull rod extending along a central axis of the sleeve;

a pulling component arranged at one end of the pull rod; and a bearing arranged at another end of the pull rod opposite to the pulling component;

wherein the pull rod is connected to an inner wall of the sleeve through the bearing, and the pull rod is rotatable relative to the sleeve;

in response to the sleeve assembly screwing the nut, the pulling component is configured to drive the bolt to be attached to a surface of the to-be-fixed component;

wherein the sleeve assembly is fixedly connected to a first end of the output shaft away from the motor;

wherein the pulling component is configured to attract the nut to move to a periphery of the pulling component in a case where the nut is received in the receiving cavity.

9. The electric tool according to claim 8, wherein a connecting channel recessed forward from a rear end face of the sleeve is defined in the sleeve, and the output shaft extends into the connecting channel such that the sleeve assembly is fixedly connected to the first end of the output shaft away from the motor.

10. The electric tool according to claim 9, wherein the pulling component comprises a magnetic steel arranged on a front end face of the pull rod.

11. The electric tool according to claim 10, wherein the pulling component further comprises a protective sleeve sleeved on an outside of the magnetic steel, the protective sleeve extends backwards from a front end of the magnetic steel, and is sleeved on a periphery of the pull rod.

12. The electric tool according to claim 9, wherein a through hole radially extending through the sleeve from a peripheral surface of the rear end of the sleeve is defined in the sleeve, the through hole is fluidly coupled to the connecting channel, the sleeve assembly comprises a pin corresponding to the through hole; in a case where a front end of the output shaft is located in the connecting channel, the pin is inserted in the through hole and penetrates the output shaft.

13. The electric tool according to claim 12, wherein a groove substantially in shape of an annulus and recessed inwards from the peripheral surface of the rear end of the sleeve is defined in the sleeve, and the through hole extends inwards from the groove and is fluidly coupled to the connecting channel;

the sleeve assembly comprises a sealing ring clamped in the groove, and in a case where the front end of the output shaft is located in the connecting channel, an inner ring of the sealing ring abuts against both ends of the pin.

14. The electric tool according to claim 8, wherein the pulling component is a magnetic component arranged at one end of the pull rod;

in response to the sleeve assembly screwing the nut, the magnetic component adsorbs the bolt, and the sleeve assembly applies a force to the bolt, such that the bolt is attached to a surface of the to-be-fixed component.

15. The electric tool according to claim 8, wherein a diameter of the pull rod assembly is smaller than an inner diameter of the nut;

a shape of the receiving cavity matches with a shape of the periphery of the nut.

16. The electric tool according to claim 8, wherein the bolt comprises a nut cap located on a side of the to-be-fixed component and a screw extending from the nut cap, penetrating the to-be-fixed component, and extending to another side of the to-be-fixed component;

wherein in response to the sleeve assembly screwing the nut, the screw extends into the receiving cavity, the pulling component pulls one end of the screw away from the to-be-fixed component.

17. The electric tool according to claim 8, wherein the electric tool is an electric wrench, and the output shaft is a wrench head at least partially exposed from a front end of the housing.

18. The electric tool according to claim 8, wherein the pull rod is axially fixed on the sleeve.

19. An electric tool configured to screw a nut to a bolt located on a to-be-fixed component, the electric tool comprising:

a housing;

an output shaft partially exposed from a first end of the housing; and a sleeve assembly comprising:

a sleeve extending along an axial direction of the output shaft, wherein the output shaft is inserted into the sleeve;

a pull rod assembly received in the sleeve and comprising:

a pull rod extending along the axis direction of the output shaft and rotatably connected to the sleeve; and a magnetic component arranged at one end of the pull rod away from the output shaft;

wherein the magnetic component is configured to attract the nut to move to a periphery of the magnetic component in a case where the nut is received in the sleeve;

wherein in response to the sleeve assembly screwing the nut, the magnetic component adsorbs the bolt, and the sleeve assembly applies a force to the bolt, such that the bolt is attached to a surface of the to-be-fixed component.

* * * * *